United States Patent [19]

Uchiyama et al.

[11] Patent Number: 5,621,827
[45] Date of Patent: Apr. 15, 1997

[54] IMAGE PROCESSING METHOD AND APPARATUS FOR OBTAINING OBJECT DATA TO RECONSTRUCT THE ORIGINAL IMAGE

[75] Inventors: Shinji Uchiyama; Hiroyuki Yamamoto, both of Yokohama; Toshikazu Ohshima, Kawasaki, all of Japan

[73] Assignee: Canon Kabushiki Kaisha, Tokyo, Japan

[21] Appl. No.: 266,683

[22] Filed: Jun. 28, 1994

[30] Foreign Application Priority Data

Jun. 29, 1993 [JP] Japan .................................. 5-159549

[51] Int. Cl.$^6$ .................................................. G06K 9/00
[52] U.S. Cl. ........................................ 382/307; 382/190
[58] Field of Search ................................. 382/154, 241, 382/285, 118, 103, 108, 190, 195, 199, 209, 217, 218, 219, 220, 221, 224, 232, 242, 243, 251, 266, 270, 274, 275, 276, 282, 286, 293, 302, 305, 307; 395/119, 125, 123, 124, 120, 152

[56] References Cited

U.S. PATENT DOCUMENTS

| 5,034,987 | 7/1991 | Fujimoto et al. | 382/154 |
|---|---|---|---|
| 5,247,590 | 9/1993 | Fukuhara et al. | 382/285 |
| 5,319,744 | 6/1994 | Kelly et al. | 395/125 |
| 5,369,737 | 11/1994 | Gholizadeh et al. | 395/123 |

FOREIGN PATENT DOCUMENTS

| 0487060A2 | 5/1992 | European Pat. Off. | G06F 15/72 |
|---|---|---|---|
| 0526881A2 | 2/1993 | European Pat. Off. | G06F 15/72 |
| 0600709A3 | 6/1994 | European Pat. Off. | G06F 15/72 |

OTHER PUBLICATIONS

"Segmented Descriptions Of 3-D Surfaces", T-J. Fan, et al., IEEE Journal of Robotics And Automation, Dec. 1987, vol. RA-3, No. 6, ISSN 0882-4967, pp. 527-538.

"Integration Of Synthetic Surface Relief In Range Images", P. Boulanger, et al., Computer Vision, Graphics, And Image Processing, Sep. 1989, vol. 47, No. 3, ISSN 0734-189X, pp. 361-372.

*Primary Examiner*—Leo Boudreau
*Assistant Examiner*—Bijan Tadayon
*Attorney, Agent, or Firm*—Fitzpatrick, Cella, Harper & Scinto

[57] ABSTRACT

An image processing method and the apparatus thereof for approximating an object shape and reconstructing the corresponding image by subjecting a radial range image to approximating with polygons and reconstructing an image from these polygons execute the following processes. At block B210, reading a radial range image data is executed. At block B220, a plural of different resolution radial range images are generated based upon the read radial range image. At block B230, normal vectors, according to each resolution of a radial range image, are calculated. At block B240, an edge-map having a plural of edges is generated in such a manner that a plural of edges are generated depending upon the resulting normal vectors and the radial range images of different resolutions. At block B250, the edge-maps of all kinds of resolutions are ORed to form a synthesized map. The synthesized map is subjected to correcting crossing and isolated edges. At block B260, each polygon is divided into a plural of triangles. At block B270, assigning 3 dimensional coordinate values and the normal vector generated at block B230 to each apex and the corresponding triangle plane respectively, is executed. At block B280, eliminating unnecessary triangle gaps around a T-shaped point is executed.

40 Claims, 18 Drawing Sheets

DEFINITION OF CHAIN CODES FOR PERIPHERAL DOTS

FIG. 16
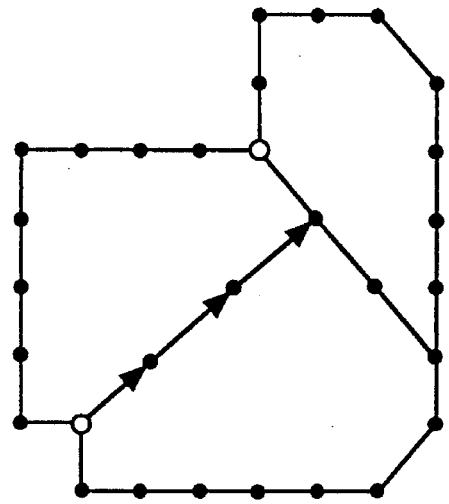
FIG. 16(c)
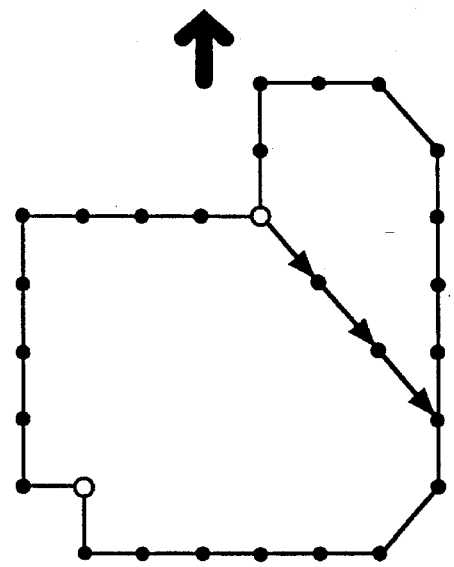
FIG. 16(b)
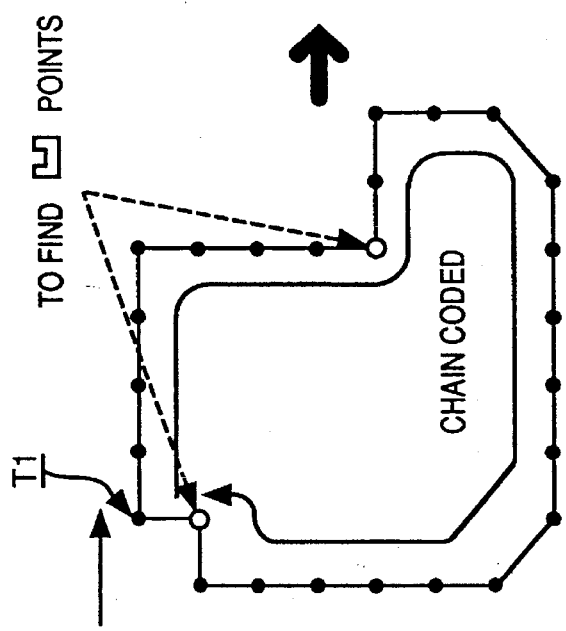
FIG. 16(a)

FIG. 17

```
polygon
point 3266          ← THE NUMBER OF APEXES
          x              y              z
     v  24.153140    54.900833    123.167895  ⎤ AN APEX DATA
     n   0.000000     0.000000      1.000000  ⎦
     v  48.258450    83.814941     61.577557         ← VERTEX'S COORDINATE
     n   0.112526     0.992749     -0.042271         ← VERTEX'S NORMAL VECTOR
     v  58.322227    52.810696     61.646614
     n   0.848765    -0.120929     -0.514757
              ........
     v  43.638390    26.144989      2.357288
     n  -0.081159    -0.903429     -0.420985 endpoint
patches 5410        ← A NUMBER OF TRIANGLE POLYGONS 104    132     36
      36    132    103
     123    135     39        ← THREE APEX NUMBERS
              ........
    1168   3266   2044
    3266   1108   1810 endpatches
endpolygon
```

APEX DATA

APEX CONNECTION DATA

TRIANGLE POLYGON DATA FORMAT

FIG. 18
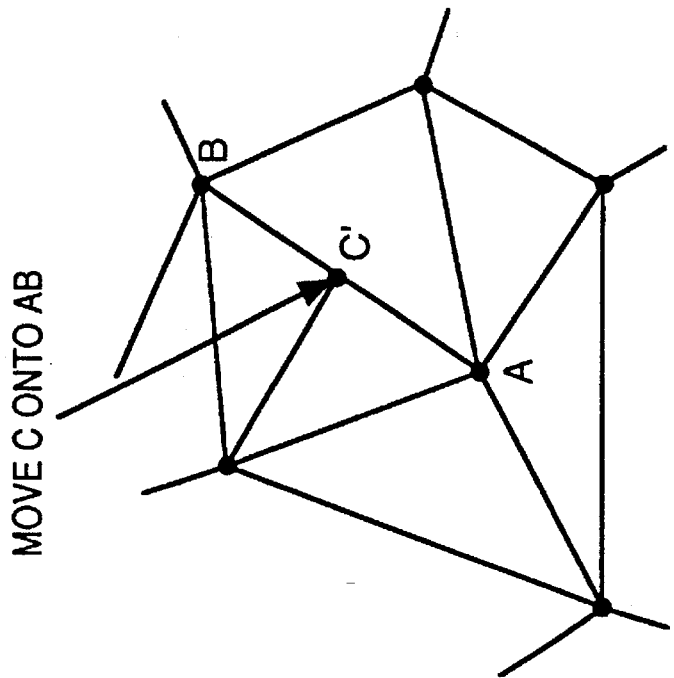
FIG. 18(b)
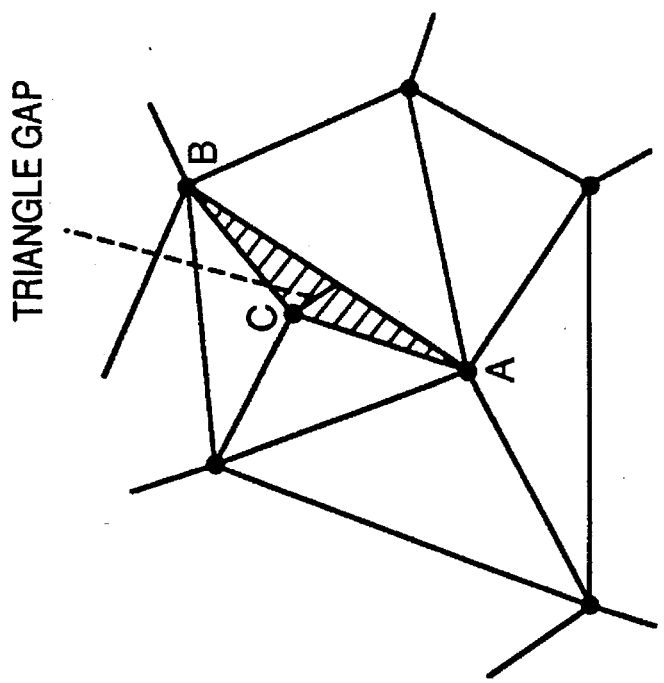
FIG. 18(a)

INTERPOLATING A NORMAL VECTOR $l : m = AC' : C'B$

A DIRECTED GRAPH FOR FIG. 20

IMAGE PROCESSING METHOD AND APPARATUS FOR OBTAINING OBJECT DATA TO RECONSTRUCT THE ORIGINAL IMAGE

BACKGROUND OF THE INVENTION

This invention relates to an image processing method and the apparatus thereof. More particularly, the invention relates to a method and apparatus in which object data, in the form of polygons corresponding to the surface shape of an object, is obtained to reconstruct the original image.

The image processing method and apparatus thereof available in the prior art, in which an object data approximating the surface shape of object is generated, by first generating 2-dimensional range image data according to the surface shape of the object viewed from a given perspective and then arranging a field of polygons, each of which is the same size, onto a 2-dimensional range image data grid.

Further, there is another image processing method and apparatus thereof available in the prior art using radial range image data, which is obtained by scanning the around-shape of an object while either the object or an image detector rotated, instead of the 2-dimensional range image data, in which dots are arranged on a radial range image data grid, in which four neighboring dots represent the apexes of a square, and the squares constructed by drawing straight line between the neighboring dots approximate the surface shape of the object.

However, in the case of making use of 2-dimensional range image data, only the front side of an object can be processed.

In the case of making use of radial range image data, the data is generated by assigning square polygons, each of which is the same size, onto the object. These are translated onto a radial range image data grid, which approximate the surface shape of the object.

Here, there is a problem in that it is impossible to accurately represent the surface shape of an object with a high resolution when the object has a complicated shape, and the number of polygons must be kept low due to data storage restrictions and processing speed.

Too many polygons are required when an accurate approximation with high resolution is sought. Objects with complicated surface shapes become extremely expensive to reproduce (due to the cost of this data storage capability) or extremely time-consuming to reproduce (due to the time required to process this much data).

SUMMARY OF THE INVENTION

The present invention has been made in consideration of the above situation, and has as its object to provide an image processing method and the apparatus thereof for approximating an object shape and reconstructing the corresponding image by subjecting a radial range image to approximating with polygons and reconstructing an image from these polygons.

According to the present invention, the foregoing objects are attained by inputting a radial range image corresponding to an direction from a prescribed axis to a point on an object's surface and the point's location to the prescribed axis, generating radial range images each having different resolutions based upon the input radial range image, calculating a normal vector at said point on each of the generated radial range images, making edge-maps each based upon neighboring points' locations around a notice point and/or the corresponding normal vectors, on each of said generated radial range images, synthesizing the edge-maps into a synthesized edge-map, generating polygon data representing an object's shape in depending upon an input radial range image based upon a synthesized edge-map.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIGS. 16(a) to 16(c) show how to generate convex polygons from an concave polygon;

FIG. 17 shows a triangle polygon data format;

FIGS. 18(a) and 18(b) show what a triangle gap problem is and how to correct it;

DETAILED DESCRIPTION OF THE PREFERRED EMBODIMENTS

A preferred embodiment of the present invention will now be described in detail with reference to the accompanying drawings.

First, the construction of a preferred embodiment will be described in short as follows.

A method for image-processing a radial range image is made up of an edge-maps generating step, in which the edge-maps are generated according to changes in the surface shape of a object (in height), a synthesizing step for synthesizing the edge-maps into a edge-map, and a polygon generating step for generating polygons to represent the surface shape of a object in a radial range image from the edge-map and normal vectors acquired from the radial range image.

The preferred embodiment of the present invention will now be described in detail, in particular, with reference to FIG. 1 through FIG. 6, FIG. 8 and FIG. 10.

Figure 1:
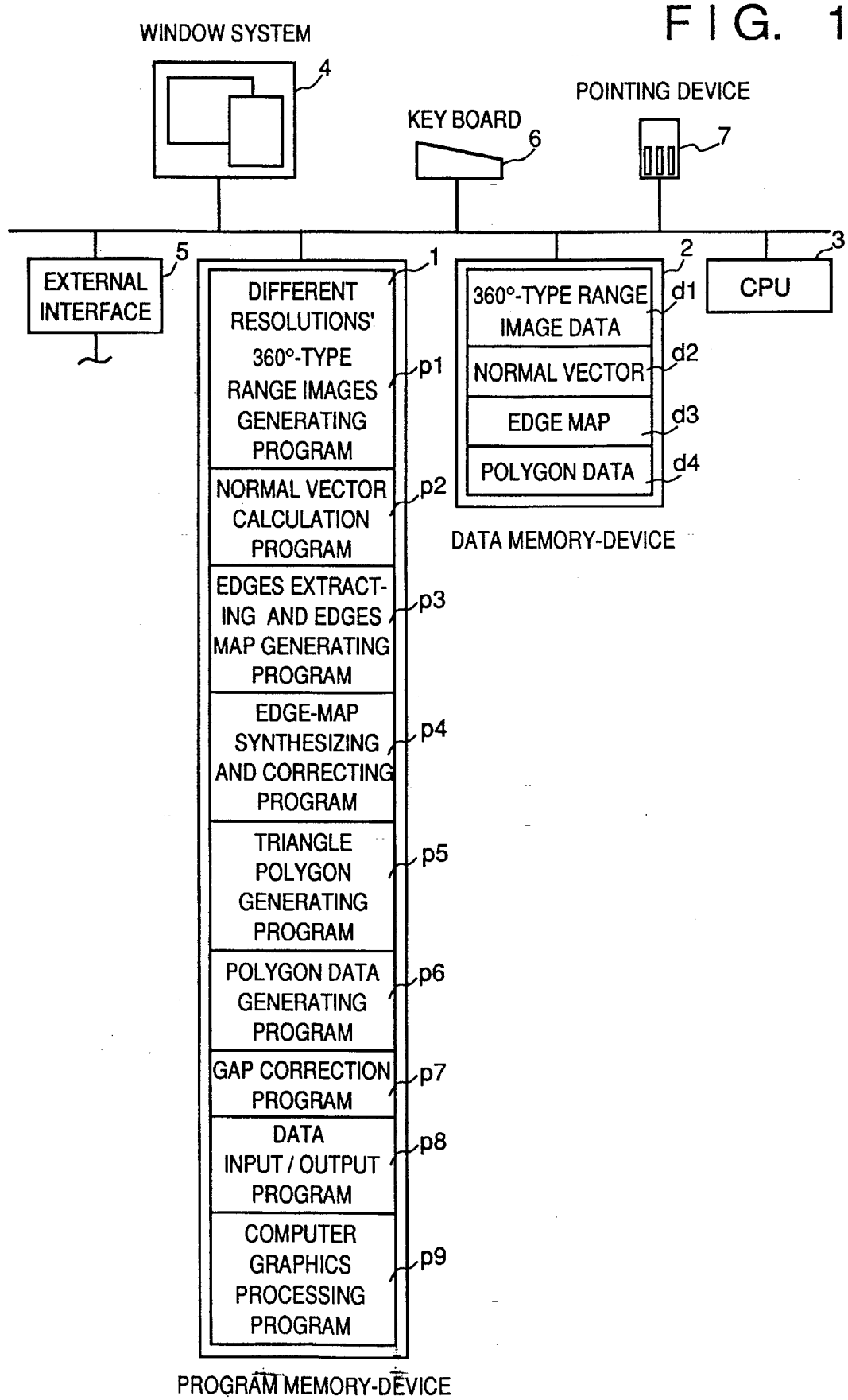
FIG. 1 is a block diagram illustrating the construction of a radial range image processing apparatus according to the embodiment of the present invention.

FIG. 1 is a block diagram illustrating the construction of a radial range image processing apparatus according to the present invention. As shown in FIG. 1, a program memory-device 1 stores several programs to execute the image processing, a data memory-device 2 stores the requisite information for the image processing and input/output data, a CPU 3 executes the program stored in program memory-device 1, a window system 4 displays the requisite information and input/output data, an input/output device 5 transfers data to/from externally connected devices for inputting the radial range image from an externally connected image detector or a data-base having radial range images, etc. and for outputting the polygons as a processed result and the data which has been processed, etc., a keyboard 6 inputs data and commands from an operator, and a pointing device 7 inputs commands and data on the window system 4. Programs P1 to P9 are executed at the individual blocks of the block diagram illustrated in FIG. 2. The results are stored in d1 to d4 of the data memory-device 2.

A radial range image is one example of the image data for constructing an image according to an original object, which can be displayed, and obtained by scanning the around-shape information and the location of an object while either the object or the image detector is rotated. A radial range image is image data which has a data structure as shown on FIGS. 3(a) and 3(b). A radial range image is stored in the 2 dimensional memory of FIG. 3(b) by arranging dots, as detecting points, on the range image around an arbitrary rotation axis and detecting intensities corresponding to these dots into range image data.

Figure 2:
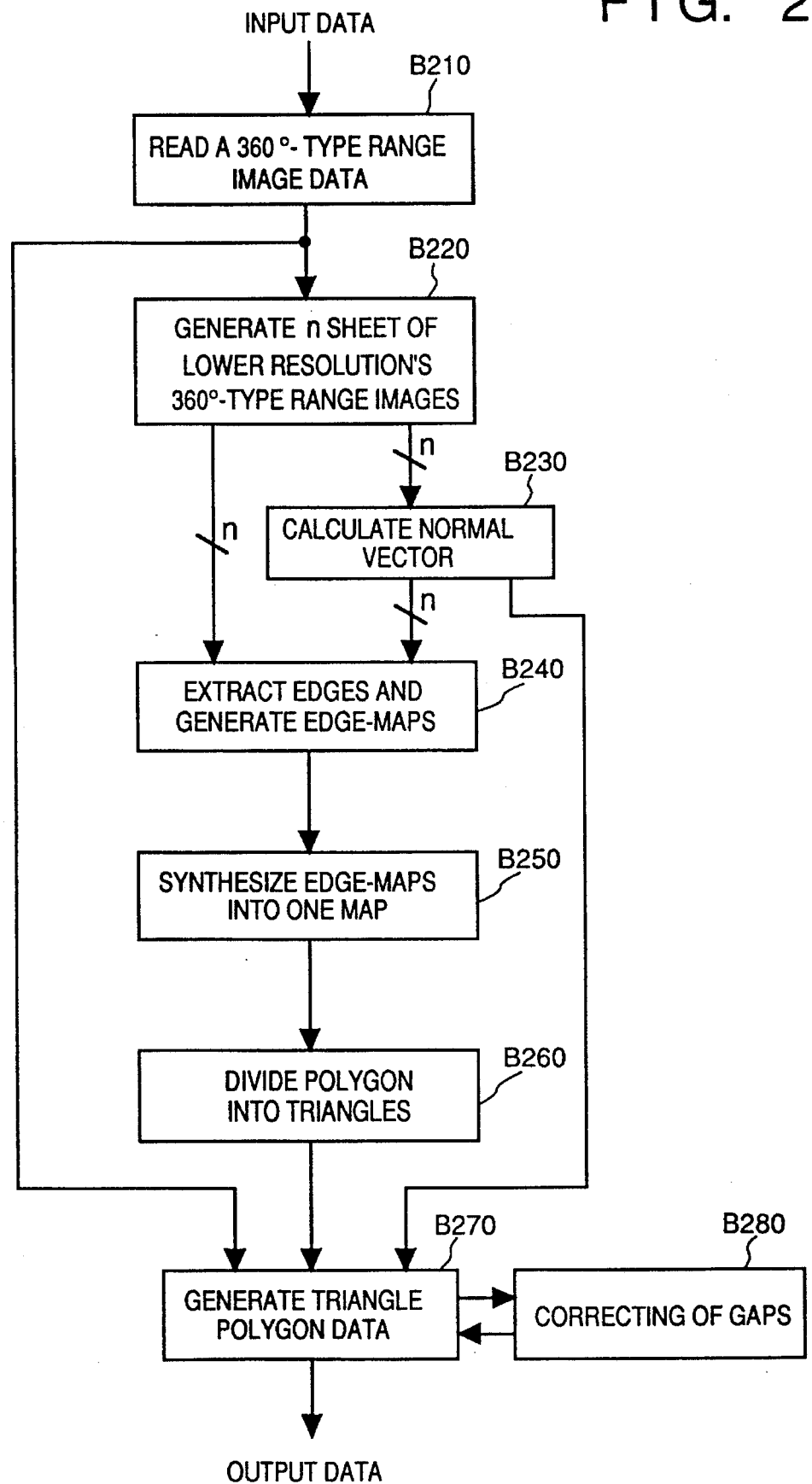
FIG. 2 is a block diagram illustrating the radial range image processing structure according to the embodiment of the present invention.

FIG. 2 is a block diagram for representing a range image processing structure according to the present invention. The processing of each block will be described.

At block B210, reading a radial range image data, through the input/output unit 5 (see FIG. 1), from a radial range image detector or from a data base of the radial range images and storing the resulting image data into a radial range image storing portion d1 are executed.

At block B220, a plural of different resolution radial range images, which have different resolutions from each other, are generated based upon the stored radial range image, wherein selecting the proper resolutions is decided by the surface shape of the object. An object having an complex surface and being constructed by an combination of various curvatures of surfaces, in general, needs a plural resolution of radial range images. Plural of resolutions of radial range images are generated in such a manner that the first resolution of an acquired radial range image from an object is regarded as the highest, this range image is then subjected to smoothing processing and a low resolution radial range image is made by executing a thinned-out operation of the resulting smoothed range image. Here, radial range images having different resolutions from each other are generated by changing the spatial range of the smoothing processing and the thinning distance in such a manner that the inputted radial range image is subjected to a noise-eliminating process using an low pass filter like a Gaussian filter to generate a plural of resolutions of radial range images including the prescribed ranges of curvature.

At block B230, normal vectors, according to each resolution of a radial range image, are calculated and stored on the numeral d2 (see FIG. 1). The normal vector is calculated in such a manner that approximated planes are generated by calculations based upon the neighborhood dots (e.g., the neighboring eight dots) of the range image using the Least Squares Method and thereby each normal vector is calculated based upon the resulting approximated planes.

Figures 3, 3A, 3B:
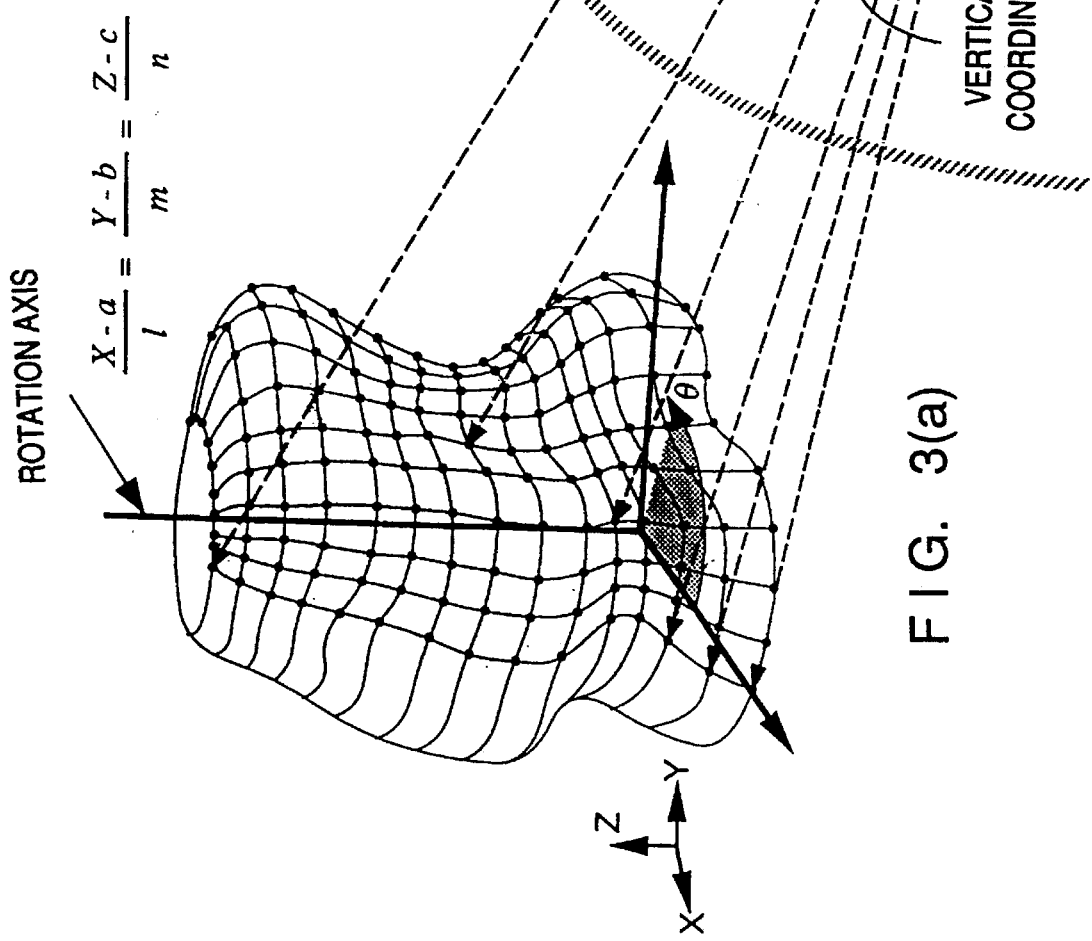
FIGS. 3(a) and 3(b) are diagrams illustrating an method of generating radial range image data used in the present invention.

A radial range image shown in FIG. 3(a) is a image having coordinate values (x, y, z) stored into the dimensional memory of FIG. 3(b) as a 2-dimensional array table. Wherein, suppose that the axis of abscissas of FIG. 3(b) is "u" and that the axis of ordinates is "v", this (x, y, z) is represented with data given the values each of x, y and z on the u-v coordinate system, or with data decided with three functions each of x(u, v), y(u, v), and z(u, v). Herein, the units of "u" and "v" are integers.

To lower the resolution of this radial range image, the range image is subjected to low-pass filtering to eliminate high frequency components (which corresponding to surface shape changes not needed between neighboring pixels), and then thinned-out. Gaussian filters, for example, work well as this low-pass filtering. Using a Gaussian filter:

$$g(u,v) = \frac{1}{2\pi\sigma_f^2} \exp\left(-\frac{u^2 + v^2}{2\sigma_f^2}\right)$$

wherein, $\sigma_f$ as a parameter is decided according to the needed resolution.

To execute low-pass filtering over a radial range image, convolution processing between x and g, between y and g, and between z and g, is carried out to obtain x', y', and z'.

$x'(u,v) = x(u,v) * g(u,v)$ $y'(u,v) = y(u,v) * g(u,v)$ $z'(u,v) = z(u,v) * g(u,v)$

In another possible method, using a 2-dimensional FFT processing of x, y, z, and g, which is expressed as the following those expressions:

$X = F(x), Y = F(y), Z = F(z), G = F(g)$

Filtering is then executed subject to the following expressions:

$X' = G \cdot X, Y' = G \cdot Y, Z' = G \cdot Z$

Then, the resulting X', Y' and Z' are subjected to inverse FFT processing to get x', y' and z'. The inverse FFT's expression is as follows:

$$x'=F^{-1}(X'), \ y'=F^{-1}(y'), \ z'=F^{-1}(Z')$$

In the case of a range image proposed by Kitamura (See Proceedings of 23rd Joint conference on Imaging technology; pp. 267–270), the axis of abscissas and the axis of ordinates of a image correspond to the 3-dimensional coordinate values x and y respectively, and each image value designated with x and y is data corresponding to a z, that is, the data is represented with z(x, y). Herein, Low-pass filtering is carried out based upon the following expression:

$$z'(x,y)=z(x,y)*g(x,y)$$

At block B240, an edge-map having a plural of edges is generated using the program P3 (FIG. 1) in such a manner that a plural of edges are generated depending upon the resulting normal vectors and the radial range images of different resolutions, and then this plural of edges is stored into the data memory-device portion d3 in FIG. 1.

Figure 12:
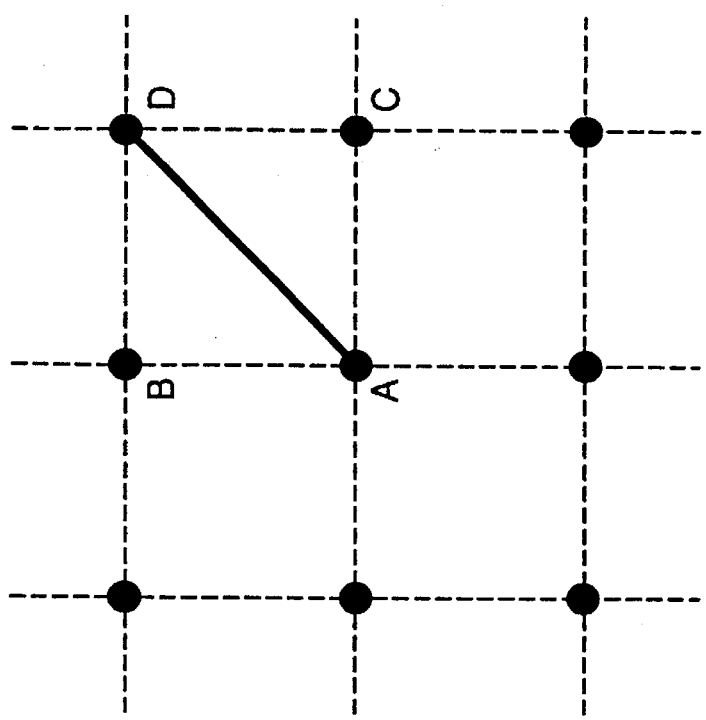
FIG. 12 shows how to decide if edges exist.
Figure 11:
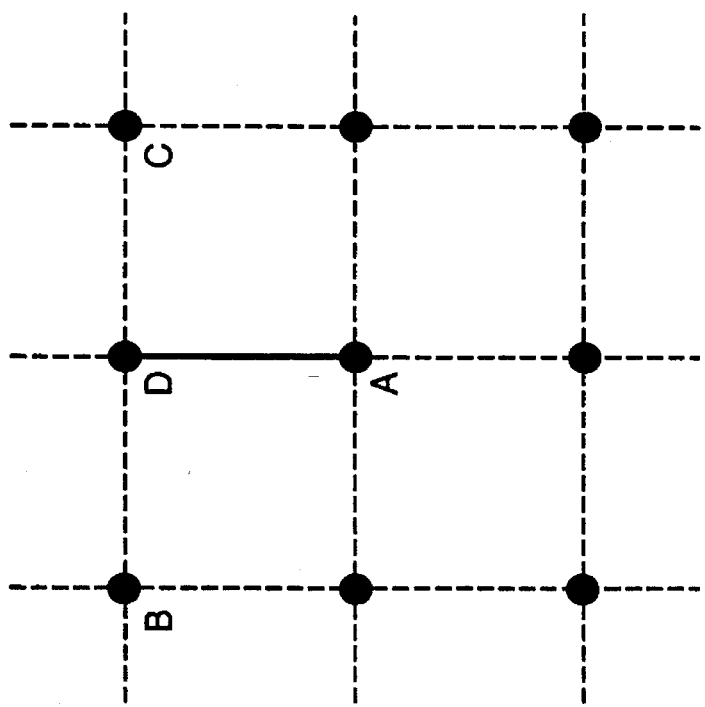
FIG. 11 shows how to decide if edges exist.

More detail of how the edges are generated, and how it is decided if edges may exist is described below with reference to FIG. 11 and FIG. 12. These Figures are examples of neighboring image-dots for explaining a basic rule deciding if edges may exist between neighboring dots. As shown in FIG. 11 and FIG. 12, if an angle (hereinafter referred to as "θ") between normal vectors of the dot "B" and "C" is larger than a prescribed threshold value, it will be decided that an edge (e.g. a roof edge) illustrated by the line between the dots "A" and "D" is between them.

Herein the θ is obtained through the following expression.

$$\theta = \cos^{-1}\left(\frac{|\vec{n_1} \cdot \vec{n_2}|}{|\vec{n_1}||\vec{n_2}|}\right)$$

wherein, $\vec{n}_1$ and $\vec{n}_2$ denote normal vectors of the dot "B" and "C", respectively Another process to decide if there is an edge there, for example, depend on if the difference between the range values of the dot "B" and "C" is larger than the prescribed threshold value. If it is larger, then it is decided that an edge (e.g., a jump edge) shown as the line between dot "A" and "D" exists.

Figure 13:
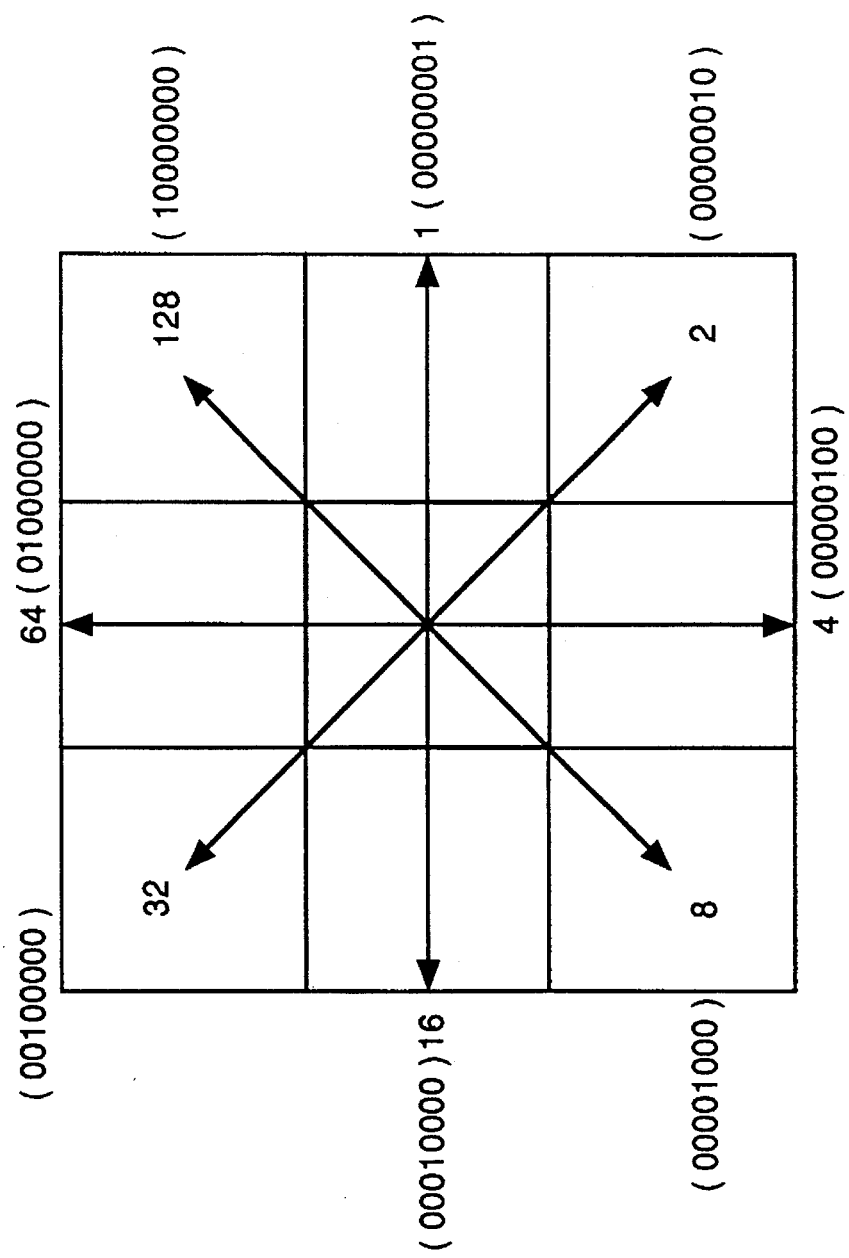
FIG. 13 is a figure illustrating a definition of chain codes for representing edges' structure.

Next, the data format of the edge-map will be described below with reference to FIG. 13. FIG. 13 shows the configuration of eight neighboring dots in relation to the center dot in light black and each of the eight neighboring dots is given a numeral code, which is represented either by a decimal number (or by the binary numbers in the parentheses) based upon the direction from the center dot to each of the eight neighboring dots. Wherein, if it is decided that there is an edge between two dots, one of the these numeral codes described above which goes to opposite points over this edge is stored into each dot. When there are several edges overriding on a dot, the corresponding numeral codes are ORed into an synthesized numeral code which will be stored into the corresponding dot. Therefore, all combinations of the edges can be represented with byte data, or eight bits' data.

With reference to the inevitable joint of a radial range image between 0° and 360° in θ shown in FIG. 3(b), it is assumed that 0° and 360° are next to each other at the joint and therefore it is processed the same as the other parts.

At block B250, the edge-maps of all kinds of resolutions are ORed to form a synthesized map by executing the p4 program (see FIG. 1). The synthesized map is subjected to correcting crossing edges, which are regarded as impossible edges here, and isolated edges. Wherein, in particular, an edge portion of the radial range image is also successively synthesized and corrected since both array's edges of the radial range image connect. As a result, an edge-map having different densities, according to the change in surface-shape of an object, is obtained. The resulting polygon data from the edge-map are stored in the data memory-device portion d4 in FIG. 1.

A method to correct inadequate edges (if they include crossing edges, isolated edges and so on) is described below with reference to FIGS. 14(a) to 14(c) and FIG. 15.

Figure 14:
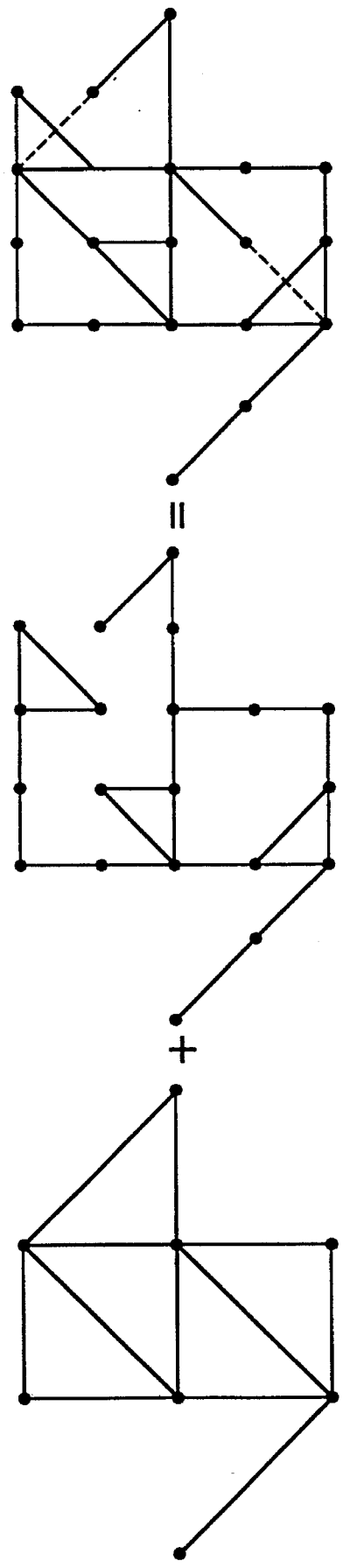
FIGS. 14(a) to 14(c) show how to correct inadequate edges.

The method is made up of four major processing steps, where the first step is to synthesize these edge-maps in such a manner that corresponding apexes between the edge-maps shown in FIGS. 14(a) and 14(b) are aligned, the second step is to correct for crossing edges, the third step is to eliminate isolated edges, and last step is to lengthen discontinuous edges.

After the first step has been executed, if some crossing edges are found on the resulting synthesized edge-map, these crossing edges will be processed in the second step.

In the second step, these crossing edges are subjected to correction in such a manner that the higher resolution edge has the higher priority to eliminate lower resolution edges. Referring to FIG. 14(c), the two dashed lines have been eliminated as inferior crossing edges.

In the third step, if the resulting edge-map processed in the second step includes discontinuous edges, these edges are checked to see if the following restrictions are satisfied or not. If they are satisfied, the corresponding edge is subjected to an eliminating process. The restrictions are as follows:

A. If there are isolated edges having a length less than the prescribed threshold value, these will be eliminated.

B. If there are edges which result in an open tip which are of a length less than the prescribed threshold value, these will be eliminated.

In the last step, if there are edges which result in an open tip which are of a length larger than the prescribed threshold value, then these resulting edges are extended in the direction of the open tip and another edge or tip is met.

FIGS. 14(a) and 14(b) are a lower resolution edge-map and a higher resolution edge-map, respectively. FIG. 14(c) is the corrected result of these edge-maps.

Figure 15:
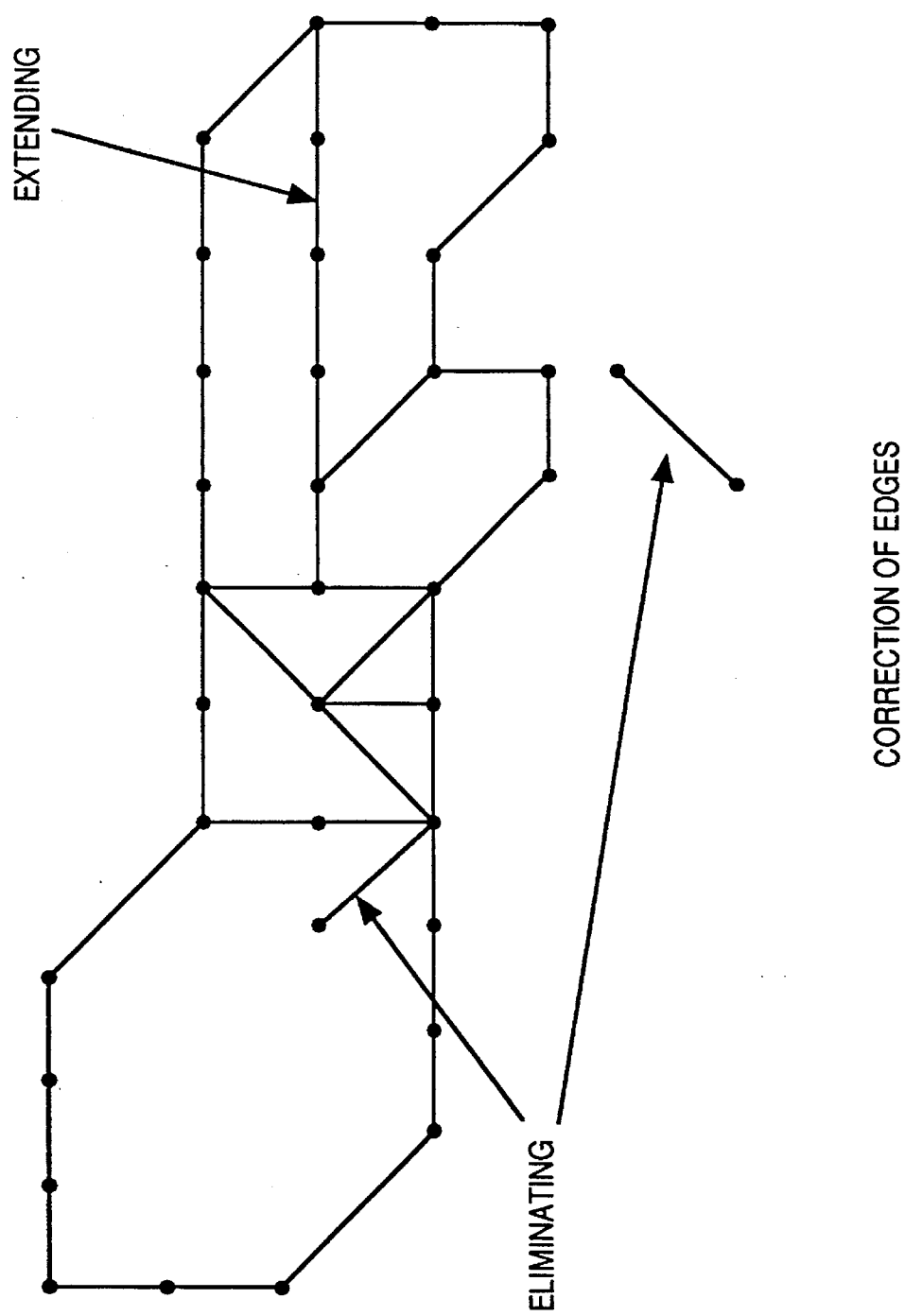
FIG. 15 shows how to correct inadequate edges.

FIG. 15 shows the resulting example of the above mentioned eliminating and/or extending processes.

At block B260, since the edge-map described above contains a plural of polygons, each polygon is divided into a plural of triangles by executing program p5 (see FIG. 1). With reference to FIGS. 16(a) to 16(c) these dividing steps will be detailed.

In the first step, with reference to FIG. 16(a), the edge-map image is scanned to look for the tips of the edges, then when one of the edges' tips is spotted, for example, T1 in FIG. 16(a), it is assumed to be the first spotted dot. Using this spotted dot as the starting point of the processing, it starts to trace the edge clockwise to generate chain codes corresponding to the edge tracing direction using the codes defined in FIG. 13. The resulting chain codes represent closed polygon shapes. Using these, it is easy to decide which sort of shape part of a edge has, i.e., whether it has a straight, turning right, or turning left shape.

In the second step, the finding concave contours process is carried out based upon the resulting chain codes. In FIG. 16(a), the two small circles represent minimum points in concave shapes as found with the above process, for example.

In the third step, to divide the polygon (including concave shapes) into several convex polygons at the minimum point dots, bisectors of the obtuse angles around these minimum point dots are lined up with a dot on another edge of the polygon. An example of the lining bisectors is shown in FIG. 16(b) where a bisector is lined up from a minimum point dot. FIG. 16(c) is a illustration of lining the other bisector to the obtuse angle around the other minimum point dot in the same way as described above.

In the last step, since a polygon including concave shapes has divided into only convex polygons, these convex polygons are subjected to dividing into triangles in a way that a vertex is selected from a polygon and lines between the selected vertex and the other vertexes are lined up to divide into several triangles.

With respect to these steps described above, it has been assumed that both sides of 0° and 360° are continuous.

At block B270, since each of these triangle polygons generated at block B260 has been only 2-dimensional data including three coordinates-values to the apexes of each triangle and each connection data between neighboring apexes of a triangle, it is needed to assign 3 dimensional coordinate values and the normal vector generated at block B230 to each apex and the corresponding triangle plane respectively. This assigned data is named "3-dimensional polygon data" here. Herein, the 3 dimensional coordinate values are acquired from the radial range image data at block B210, and the normal vectors are acquired from the ones at block B230. FIG. 17 shows an example of the 3-dimensional polygon data format as a result of this block's processing. The 3-dimensional polygon data is stored in d4 of the data memory-device (see FIG. 1). This block's processing is executed by program p6.

The 3-dimensional polygon data includes a number of apexes, apex data, a number of triangle polygons, and apex connection data between neighboring apexes. The apex data includes 3 dimensional coordinate values each of x, y and z coordinates, which are on lines started at "v" in FIG. 17, and a normal vector represented by x, y and z components, which are on lines started at "n" in FIG. 17. Each apex data is numbered from 1 in increment order implicitly. The connection data includes three implicit apex numbers. The order of the connection data is counter-clockwise to apexes of a triangle polygon.

At block B280, since there may be a problem at any T-shape on polygons detailed as follows, this block resolves any problems by executing program p7 (see FIG. 1).

With reference to FIGS. 18(a) and 18(b), this problem will be described. As described before, the resulting triangle polygons have consisted of different resolution images' data. Therefore, any T-shaped point may not be on a passing line. FIGS. 18(a) and 18 (b) illustrates the problem on a T-shaped point, where the point C is not on the line AB in 3-dimensional coordinates, even thought point C is on line AB in 2-dimensional coordinates. In 3-dimensional coordinates, an unnecessary triangle gap, or the ABC in FIG. 18(a) possibly exists.

Therefore, in this block, several steps of eliminating unnecessary triangle gaps are executed. Each of the steps is described below with reference to FIG. 18(b).

In first step, a point C' on the line AB is set so as to satisfy the following expression:

AC:CB=AC':C'B.

In second step, the point C is subjected to moving onto the point C' to eliminate the triangle gap.

Figure 19:
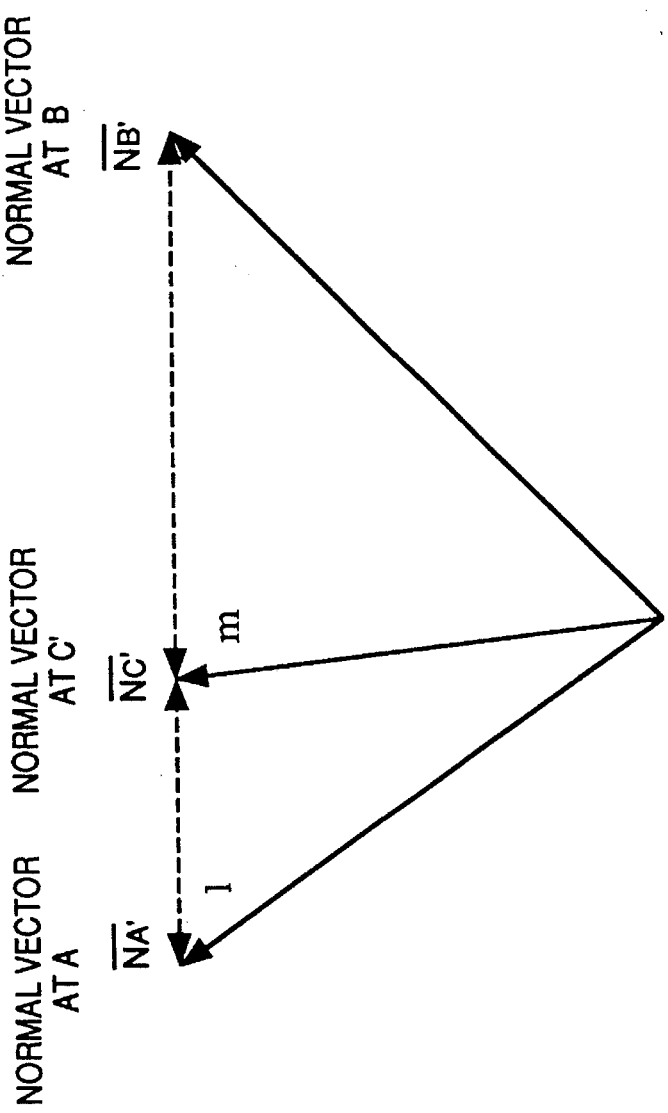
FIG. 19 shows how to interpolate a normal vector at a T-shaped joint point.

In third step, a normal vector at point C' is calculated to render the corresponding image on any image forming apparatus using any computer graphics. FIG. 17 illustrates how to get the normal vector here. The normal vector at point C' is acquired by linearly interpolating the normal vectors at point A and B as shown in FIG. 19. The expression to interpolate is as follow:

$$\vec{n_{C'}} = \frac{m\vec{N_A} + l\vec{N_B}}{l + m}$$

Then, the interpolated Nc' is subjected to normalizing.

Figure 20:
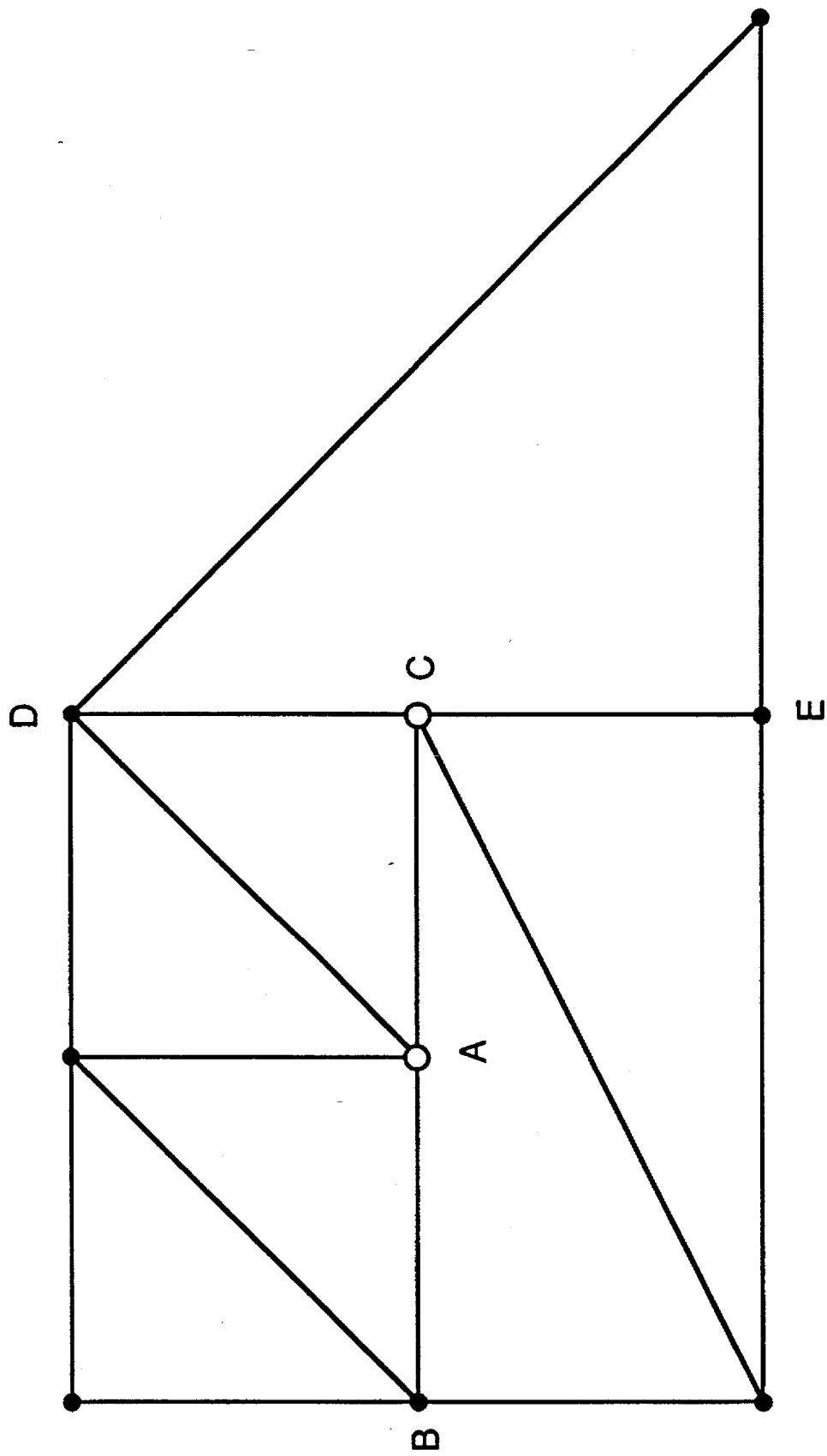
FIG. 20 shows a example of more complicated polygon networks.

FIG. 20 is a illustration of a more complicated polygon networks' example that a joint point in a T-shape connects to a joint point in another T-shape, which may occur in a complicated object shape. The polygon networks in FIG. 20 in 3-dimensional coordinates have the same problems as the triangle gap described before, in which a gap may exist between the points A and C. To eliminate this gap, C's interpolation is needed before A's interpolation can be carried out.

Figure 21:
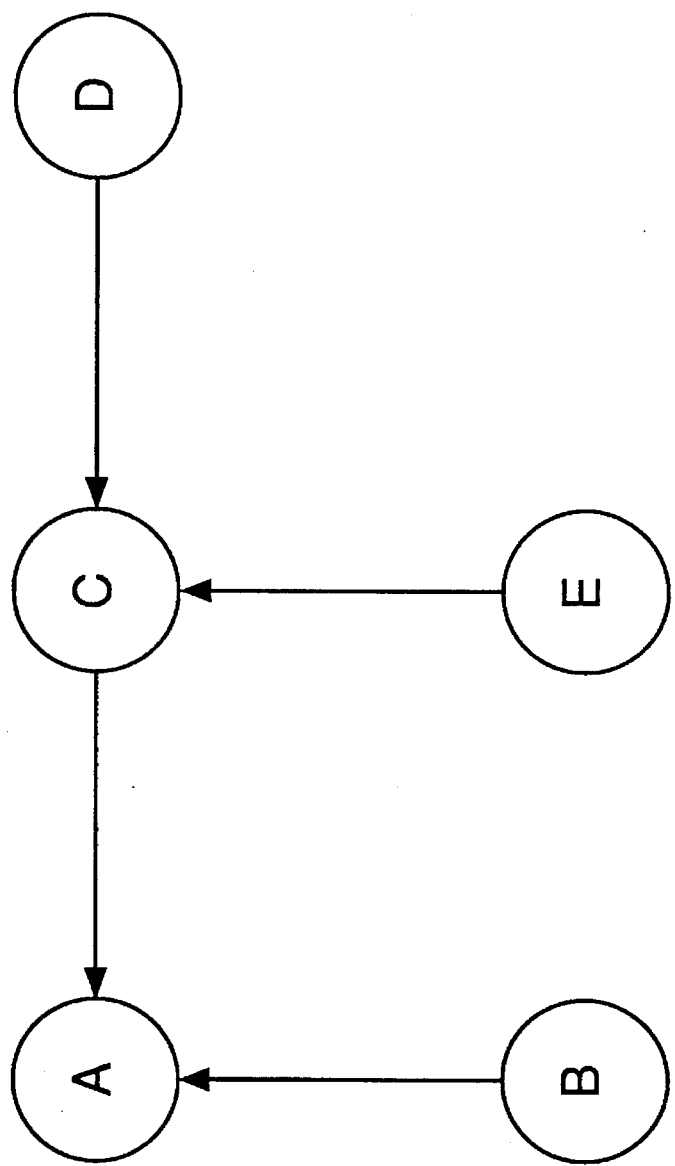
FIG. 21 shows a directed graph according to FIG. 20.

FIG. 21 is a illustration of a directed graph representing the connecting relation in FIG. 20. With reference to FIG. 21 to interpolate the T-shape's joint points, it is obvious that firstly C is acquired both from E and D, and then A is acquired both from the acquired C and B.

At actual interpolating the T-shape joint points, the following steps are executed:

Step 1. If both tips of a line including a point needing interpolating are not a T-shape's joint point, then this point is interpolated from the tips.

Step 2. Or, the same processing as just above described is recursively executed. This is a process of getting an answer while searching for binary trees recursively.

By executing each blocks' functions mentioned above, a number of triangle polygons representing an original object shape are generated.

Figure 4:
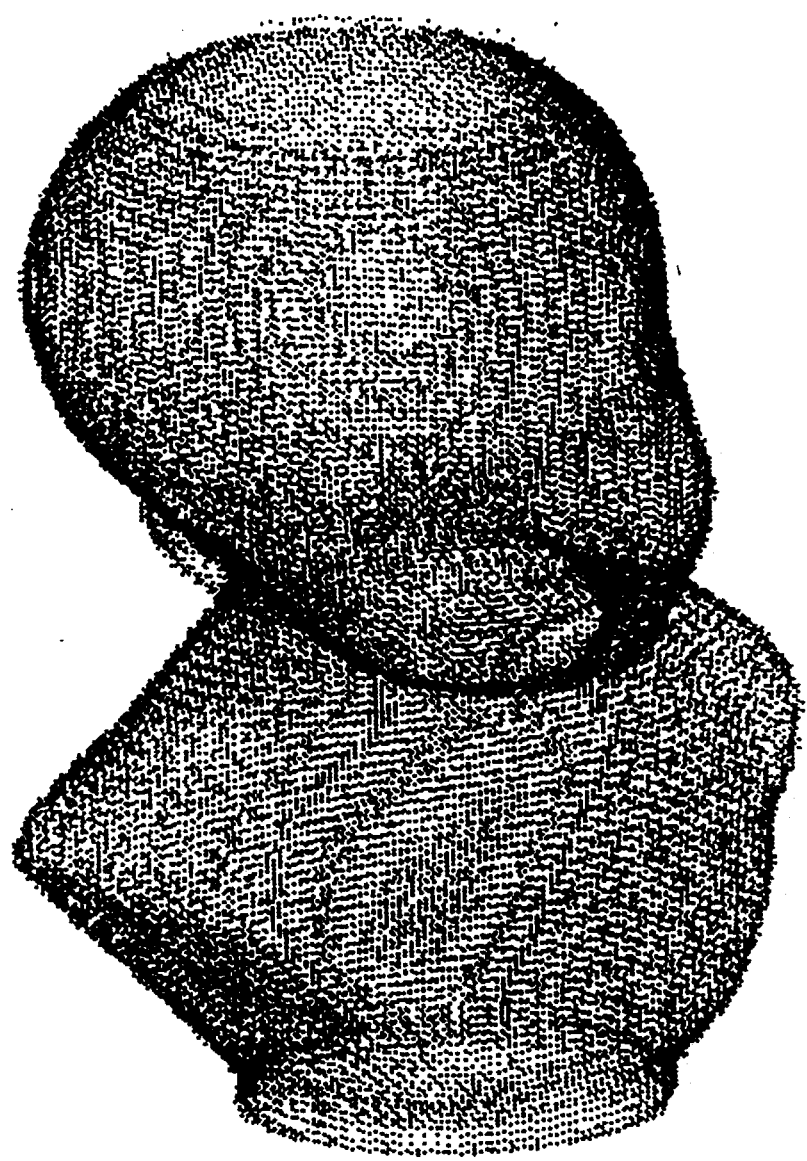
FIG. 4 is a representation of an example of radial range image data, which has been generated by mapping coordinate values in 3-dimensions, as shown in FIGS. 3(a) and 3(b), into a 3-dimensional space and projecting the resulting values onto a 2-dimensional plane.
Figure 5:
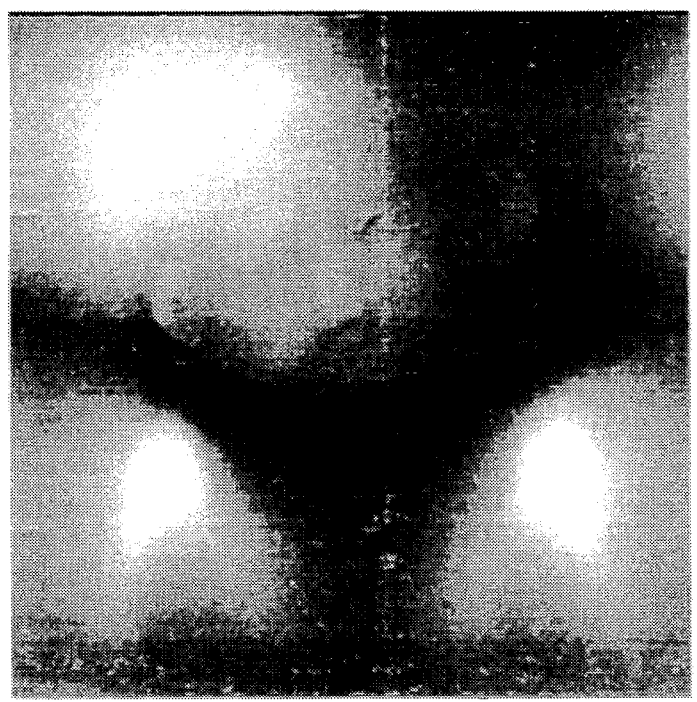
FIG. 5 is a representation of the same radial range image data as in FIG. 4, which has been generated by changing the radial range image data illustrated in FIGS. 3(a) and 3(b) into intensity data, where it is assumed that the radial range image data is regarded as a 2-dimensional image, and displaying the resulting data on a monitor.

FIGS. 4 and 5 show an example of an radial range image, in a different displaying manners, used to prove this preferred embodiment.

FIG. 4 shows a reflection image reconstructed on a 2 dimensional plane, which is reconstructed in such a way that the 3 dimensional coordinate values of the radial range image illustrated in FIG. 3(a), as dots, are placed on a 3 dimensional space, and these dots are reflected onto the 2 dimensional plane, then the reflected image is displayed.

FIG. 5 shows a depth image reconstructed on a 2 dimensional plane, which is represented as intensity data in proportion to each of the radial range image data illustrated in FIG. 3(b).

Figure 6:
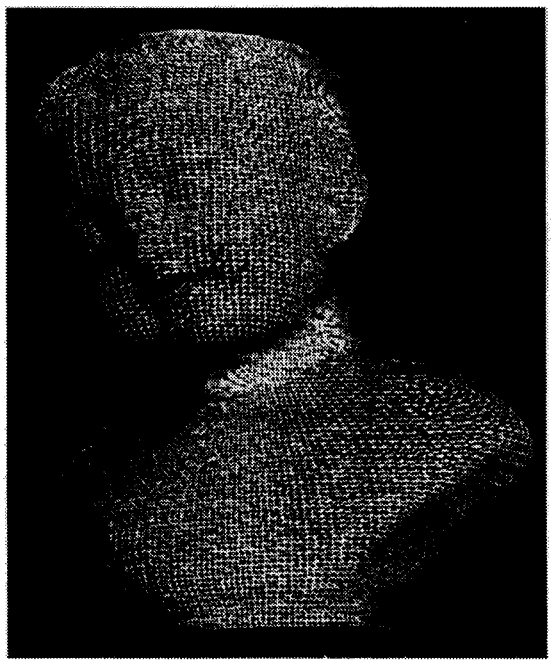
FIG. 6 is the result of making polygons from radial range image data described above according to the prior art.

FIG. 6 shows a reconstructed image based upon square polygons which are generated in such a way that the radial range image is divided into a number of squares each having the same size.

Figure 7:
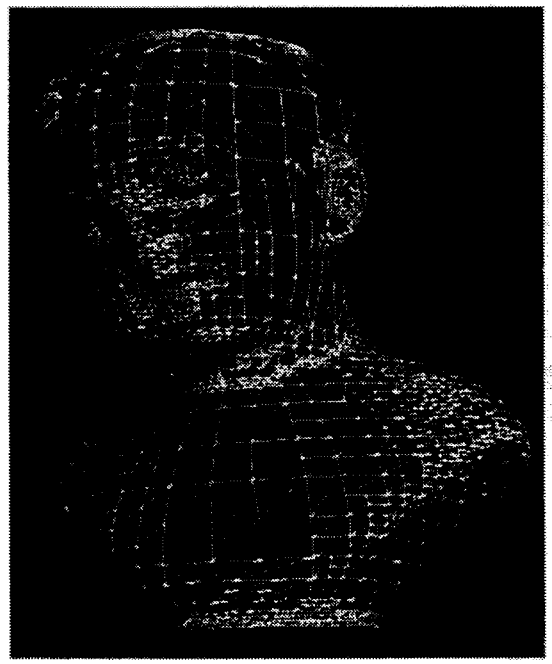
FIG. 7 is the result of making polygons from radial range image data according to the present invention.

FIG. 7 shows a reconstructed image of a radial range image based upon this preferred embodiment, wherein this reconstructed image is made from a number of triangle polygons.

As seeing the polygons illustrated in FIG. 7, it is obvious that the radial range image is represented with much less polygons than with the same squares based upon the prior art, and the reconstructed image using this preferred embodiment keeps a high approximation of precision to the original object's shape to be reconstructed and displayed.

Figure 8:
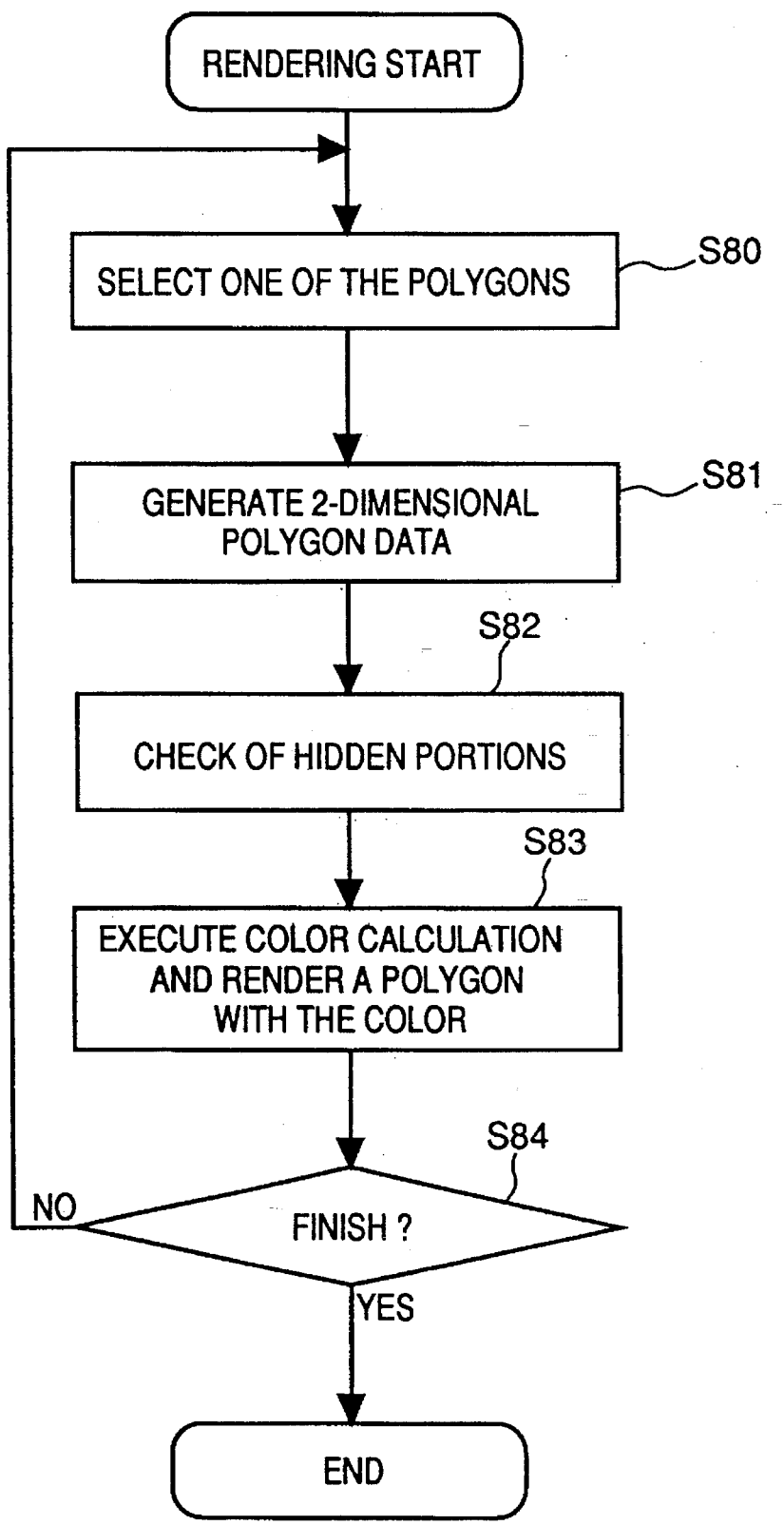
FIG. 8 is a chart illustrating how the polygons generated by using the radial range image data described above are rendered on a display (i.e., window system 4 (see FIG. 1))

FIG. 8 is a flowchart illustrating the processing steps for rendering the polygons generated using this preferred embodiment to reconstruct a original object's shape. This processing is executed using the computer graphics program p9 (see FIG. 1).

As mentioned before with reference to FIG. 17, the resulting triangle polygon data includes 3 dimensional coordinate values of each of the three apexes, a normal vector and apex connection data. Such polygon data may be easily reflected onto a 2 dimensional projection plane and rendered on a display using conventional computer graphics software.

Here, example steps of rendering the polygons onto a display (ex. window system 4 in FIG. 1) are described below.

In step S80, a polygon is selected out of the polygons.

In step S81, each of the polygon's apexes are changed into 2 dimensional polygon data on a 2 dimensional projection plane.

In step S82, it is checked if image portions of the 2-dimensional polygon has been hidden by the other plane or other polygons. Then, it goes to step S83, where a color to be assigned on the 2-dimensional polygon is calculated based upon light source data, a normal vector and so on, and this calculated color is assigned to the polygon and rendered on some display (i.e. Window system 4; see FIG. 1) except for the hidden image portions.

In step S84, it is checked if all the polygons have been handled, if not, then it goes back to step S80 and repeats the same processing for the next polygon. If they have all been handled, this rendering processing is over.

Figure 9:
FIG. 9 is the result of rendering an image of an object based upon the generated polygons using computer graphics processing according to the prior art.

FIG. 9 is the result of rendering an image of an object based upon the generated square polygons each having the same size using computer graphics processing.

Figure 10:
FIG. 10 is the result of rendering an image of an object based upon the generated polygons using computer graphics processing according to the present invention.

FIG. 10 is the result of rendering an image of an object based upon the generated individual triangle polygons made by this preferred embodiment, using computer graphics processing.

Comparing FIG. 9 to FIG. 10, it is obvious that the method using polygons generated by this preferred embodiment, which result in FIG. 10, is the same quality as the one generated by the prier art in terms of the rate of approximating the corresponding original surface shape of an object even though the number of polygons has been reduced.

Further, there's another image processing method and apparatus thereof available in the prior art using radial range image data instead of the 2-dimensional range image data, in which dots are arranged on a radial range image data grid, in which four neighboring dots represent the apexes of a square, and the squares constructed by drawing a straight line between the neighboring dots approximate the shape of the object.

Thus, in accordance with the present invention as described above, in keeping image reconstruction quality, the number of polygons can be much reduced. As a result, the time consumed generating polygons according to an original object shape and reconstructing an image from the polygons can be reduced.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for approximating an object shape and reconstructing the corresponding image by subjecting a radial range image to approximating with polygons, comprising:

inputting means for inputting a radial range image corresponding to a direction from a prescribed axis to a point on an object's surface and the point's location to the prescribed axis;

generating means for generating radial range images each having different resolutions based upon the input radial range image by said inputting means;

calculating means for calculating a normal vector at said point on each of the generated radial range images by said generating means;

making means for making edge-maps each based upon neighboring points' locations around a notice point and the corresponding normal vectors calculated by said calculating means, on each of said generated radial range images;

synthesizing means for synthesizing the edge-map made by said making means into a synthesized edges-map; and polygon data generating means for generating polygon data representing an object's shape depending upon an input radial range image input by inputting means, based upon a synthesized edge-map synthesized by said synthesizing means.

2. An image processing apparatus for approximating an object shape and reconstructing the corresponding image by subjecting a radial range image to approximating with polygons, comprising:

inputting means for inputting a radial range image corresponding to a direction from a prescribed axis to a point on an object's surface and the point's location to the prescribed axis;

generating means for generating radial range images each having different resolutions based upon the input radial range image by said inputting means;

edge deciding means for deciding whether or not an edge exists, which should be extracted, between a notice point and its neighbor point based upon information in terms of said notice point and the neighbor point;

edge extracting means for extracting an edge when said edge deciding means decides that the edge exists;

making means for making edge-maps based upon the edge extracted by said edge extracting means;

synthesizing means for synthesizing the edge-maps by said making means into a synthesized edge-map; and polygon data generating means for generating polygon data representing an object's shape depending upon a synthesized edge-map synthesized by said synthesizing means.

3. An image processing apparatus for approximating an object shape and reconstructing the corresponding image by subjecting a radial range image to approximating with polygons, comprising:

inputting means for inputting a radial image corresponding to a direction from a prescribed axis to a point on an object's surface and the point's location to the prescribed axis;

generating means for generating radial range images each having different resolutions based upon the input radial range image by said inputting means;

calculating means for calculating a normal vector at said point on each of the generated radial range images by said generating means;

making means for making edge-maps each based upon neighboring points' locations around a notice point and the corresponding normal vectors calculated by said calculating means, on each of said generated radial range images;

edge correction means for correcting edges based upon the result of ORing among said edge-maps;

synthesizing means for synthesizing the edge-maps made by said making means into a synthesized edge-map on the basis of the edges corrected by said edge correction means; and polygon data generating means for generating polygon data representing an object's shape depending upon an input radial range image input by said inputting means, based upon a synthesized edge-map synthesized by said synthesizing means.

4. An image processing method for approximating an object shape and reconstructing the corresponding image by subjecting a radial range image to approximating with polygons, comprising:

an inputting step for inputting a radial range image corresponding to a direction from a prescribed axis to a point on an object's surface and the point's location to the prescribed axis;

a generating step for generating radial range images each having different resolutions based upon the input radial range image by said inputting step;

a calculating step for calculating a normal vector at said point on each of the generated radial range images by said generating step;

a making step for making edge-maps each based upon neighboring points' locations around a notice point and the corresponding normal vectors calculated by said calculating step, on each of said generated radial range images;

a synthesizing step for synthesizing the edge-maps made by said making step into a synthesized edge-map; and a polygon data generating step for generating triangle polygon data by dividing a polygon in the synthesized edges-map synthesized by said synthesizing step; and an interpolating step for interpolating if a T-shaped joint exists in said triangle polygon data generated by said polygon data generating step.

5. The apparatus according to claim 2, wherein said comprises an edge deciding means decides if an edge exist between a notice point and the neighboring point based upon the difference between inputted range values by said inputting means between opposite ends of a perpendicular to the possible edge.

6. The apparatus according to claim 3, wherein said edge correcting means comprises a crossing-edge correcting means for ORing the edge-maps made by said making means into a ORed edge-map and correcting crossing-edges in the Ored edge-map.

7. The apparatus according to claim 6, wherein said crossing-edge correcting means selects the edge of the higher resolution range image generated by said generating means out of said crossing-edges.

8. The apparatus according to claim 3, wherein said edge correcting means comprises an isolated-edge correcting means for ORing the edge-maps made by said making means into an ORed edge-map and correcting an edge having at least one open tip in this ORed edge-map.

9. The apparatus according to claim 8, wherein said isolated-edge correcting means eliminates an edge less than a prescribed length.

10. The apparatus according to claim 8, wherein said isolated-edge correcting means extends an edge longer than a prescribed length.

11. An edge processing apparatus for approximating an object shape and reconstructing the corresponding image by subjecting a radial range image to approximating with polygons, comprising:

inputting means for inputting a radial image corresponding to a direction from a prescribed axis to a point on an object's surface and the point's location to the prescribed axis;

generating means for generating radial range images each having different resolutions based upon the input radial range image by said inputting means;

calculating means for calculating a normal vector at said point on each of the generated radial range images by said generating means;

making means for making edge-maps each based upon neighboring points' locations around a notice point and the corresponding normal vectors calculated by said calculating means, on each of said generated radial range images;

synthesizing means for synthesizing the edge-maps made by said making means into a synthesized edge-map; and polygon data generating means for generating triangle polygon data by dividing a polygon in the synthesized edges-map synthesized by said synthesizing means; and interpolating means for interpolating if a T-shaped joint exists in the said triangle polygon data generated by said polygon data generating means.

12. An image processing method for approximating an object shape and reconstructing the corresponding image by subjecting a radial range image to approximating with polygons, comprising:

an inputting step for inputting a radial range image corresponding to a direction from a prescribed axis to a point on an object's surface and the point's location to the prescribed axis;

a generating step for generating radial range images each having different resolutions based upon the input radial range image by said inputting step;

an edge deciding step for deciding whether or not an edge exists, which should be extracted, between a notice point and its neighbor point based upon information in terms of said notice point and the neighbor point;

an edge extracting step for extracting an edge when that the edge exists is decided at said edge deciding step;

a making step for making edge-maps each based upon the edge extracted by said edge extracting step;

a synthesizing step for synthesizing the edge-maps made by said making step into a synthesized edge-map; and a polygon data generating step for generating polygon data representing an object's shape depending upon an input radial range image input by said inputting step, based upon a synthesized edge-map synthesized by said synthesizing step.

13. An image processing method for approximating an object shape and reconstructing the corresponding image by subjecting a radial range image to approximating with polygons, comprising:

an inputting step for inputting a radial range image corresponding to a direction from a prescribed axis to a point on an object's surface and the point's location to the prescribed axis;

a generating step for generating radial range images each having different resolutions based upon the input radial range image by said inputting step;

a calculating step for calculating a normal vector at said point on each of the generated radial range images by said generating step;

a making step for making edge-maps each based upon neighboring points' locations around a notice point and the corresponding normal vectors calculated by said calculating step, on each of said generated radial range images;

an edge correction step for correcting edges based upon the result of ORing among said edge-maps;

a synthesizing step for synthesizing the edge-maps made by said making step into a synthesized edge-map on the basis of the edges corrected by said edge correction step; and a polygon data generating step for generating polygon data representing an object's shape depending upon an input radial range image input by said inputting step, based upon a synthesized edge-map synthesized by said synthesizing means.

14. The apparatus according to claim 11, wherein said interpolation means interpolates a T-shape joint point on said triangle polygon from both tips of sides of the T-shape joint point.

15. The apparatus according to claim 11, wherein said interpolation means interpolates a T-shape joint point's normal vector on said triangle polygon from both tips' normal vectors of sides of the T-shape joint point.

16. An image processing method for approximating an object shape and reconstructing the corresponding image by subjecting a radial range image to approximating with polygons, comprising:

inputting step for inputting a radial range image corresponding to a direction from a prescribed axis to a point on an object's surface and the point's location to the prescribed axis;

generating step for generating radial range images each having different resolutions based upon the input radial range image by said inputting means;

calculating step for calculating a normal vector at said point on each of the generated radial range images by said generating step;

making step for making edge-maps each based upon neighboring points' locations around a notice point and the corresponding normal vectors calculated by said calculating step, on each of said generated radial range images;

synthesizing step for synthesizing the edge-maps made by said making step into a synthesized edge-map; and polygon data generating step for generating polygon data representing an object's shape in depending upon an input radial range image input by inputting step, based upon a synthesized edge-map synthesized by said synthesizing step.

17. The method according to claim 16, wherein said generating step generates different resolution's range images in such a way that a radial range image input by said inputting step is subjected to eliminating high frequency components and thinning out this eliminated radial range image.

18. The method according to claim 16, wherein said calculating step calculates a normal vector on a plane approximating a part of an object surface shape by identifying this part with this plane based upon peripheral points on this part around a notice point on this part.

19. The method according to claim 12, further comprising a calculating step for calculating normal vector at said point on each of the generated radial range images at said generating step, wherein at said edge deciding step a decision whether an edge exists between a notice point and the neighboring point is made based upon the angle between two normal vectors, calculated by said calculating step, on opposite ends of a perpendicular to the possible edge.

20. The method according to claim 12, wherein in said edge deciding step a decision whether an edge exist between a notice point and the neighboring point is made based upon the difference between inputted range values by said inputting step between opposite ends of a perpendicular to the possible edge.

21. The method according to claim 13, wherein said edge correcting step comprises a crossing-edge correcting step for ORing the edge-maps made by said making step into an ORed edge-map and correcting crossing-edges in the ORed edge map.

22. The method according to claim 21, wherein said crossing-edge correcting step selects the edge of the higher resolution range image generated by said generating step out of said crossing-edges.

23. The method according to claim 13, wherein said edge correcting step comprises an isolated-edge correcting step for ORing the edge-maps made by said making step into an ORed edge-map and correcting an edge having at least one open tip in this ORed edge-map.

24. The method according to claim 23, wherein said isolated-edge correcting step eliminates an edge less than a prescribed length.

25. the method according to claim 23, wherein said isolated-edge correcting step extends an edge longer than a prescribed length.

26. The method according to claim 16, wherein said polygon data generating step generates triangle polygons by dividing a polygon enclosed with the edges generated by said synthesizing step, into these triangle polygons.

27. The method according to claim 26, wherein said polygon data generating step generates triangle polygons by dividing a concave polygon within polygons enclosed with the edges generated by said synthesizing step, into convex polygons.

28. The method according to claim 27, wherein said polygon data generating step divides said concave polygon into convex polygons in such a way that an obtuse angle around a concave point on said concave polygon is divided into two with a bisector.

29. The method according to claim 26, wherein at said interpolation step to interpolate a T-shape joint point on said triangle polygon from both tips of sides of the T-shape joint point is processed.

30. The method according to claim 4, wherein at said interpolation step to interpolate a T-shape joint point's normal vector on said triangle polygon from both tips' normal vectors of sides of the T-shape joint point is processed.

31. the apparatus according to claim 2, further comprising calculating means for calculating a normal vector at said point on each of the generated radial range images by said generating means, wherein said edge detecting means decides if an edge exists between a notice point and the neighboring point based upon the angle between two normal vectors, calculated by said calculating means, on opposite ends of a perpendicular to the possible edge.

32. The apparatus according to claim 1, wherein said generating means generates different resolution's range images in such a way that a radial range image input by said inputting means is subjected to eliminating high frequency components and thinning out this eliminated radial range image.

33. The apparatus according to claim 1, wherein said calculating means calculates a normal vector on a plane approximating a part of an object surface shape by identifying this part with this plane based upon peripheral points on this part around a notice point on this part.

34. An image processing apparatus for approximating an object shape and reconstructing the corresponding image by subjecting a radial range image to approximating with polygons, comprising:

inputting means for inputting a radial range image corresponding to a direction from a prescribed axis to a point on an object's surface and the point's location to the prescribed axis;

generating means for generating radial range images each having different resolutions based upon the input radial range image by said inputting means;

calculating means for calculating a normal vector at said point on each of the generated radial range images by said generating means;

making means for making edge-maps each based upon at least the normal vectors calculated by said calculating means, on each of said generated radial range images;

synthesizing means for synthesizing the edge-maps made by said making means in to a synthesized edge-map; and polygon data generating means for generating polygon data representing an object's shape depending upon an input radial range image input by said inputting means, based upon a synthesized edge-map synthesized by said synthesizing means.

35. An image processing apparatus for approximating an object shape and reconstructing the corresponding image by subjecting a radial range image to approximating with polygons, comprising:

inputting means for inputting a radial range image corresponding to a direction from a prescribed axis to a point on an object's surface and the point's location to the prescribed axis;

generating means for generating radial range images each having different resolutions based upon the input radial range image by said inputting means;

making means for making edge-maps each based upon at least neighboring points' locations around a notice point on each of said generated radial range images;

synthesizing means for synthesizing the edge-maps made by said making means into a synthesized edge-map; and polygon data generating means for generating polygon data representing an object's shape depending upon an input radial range image input by said inputting means, based upon a synthesized edge-map synthesized by said synthesizing means.

36. The apparatus according to claim 1, wherein said polygon data generating means generates triangle polygons by dividing a polygon enclosed with the edges generated by said synthesizing means, into these triangle polygons.

37. The apparatus according to claim 36, wherein said polygon data generating means generates triangle polygons by dividing a concave polygon within polygons enclosed with the edges generated by said synthesizing means, into convex polygons.

38. The apparatus according to claim 37, wherein said polygon data generating means divides said concave polygon into convex polygons in such a way that an obtuse angle around a concave point on said concave polygon is divided into two with a bisector.

39. An image processing method for approximating an object shape and reconstructing the corresponding image by subjecting a radial image to approximating with polygons, comprising:

an inputting step for inputting a radial range image corresponding to a direction from a prescribed axis to a point on an object's surface and the point's location to the prescribed axis;

a generating step for generating radial range images each having different resolutions based upon the input radial range image by said inputting step;

a calculating step for calculating a normal vector at said point on each of the generated radial range images by said generating step;

a making step for making edge-maps each based upon at least the normal vectors calculated by said calculating step, on each of said generated radial range images;

a synthesizing step for synthesizing the edge-maps made by said making step into a synthesized edge-map; and a polygon data generating step for generating polygon data representing an object's shape depending upon an input radial range image input by said inputting step, based upon a synthesized edge-map synthesized by said synthesizing step.

40. An image processing method for approximating an object shape and reconstructing the corresponding image by subjecting a radial range image to approximating with polygons, comprising:

an inputting step for inputting a radial range image corresponding to a direction from a prescribed axis to a point on an object's surface and the point's location to the prescribed axis;

a generating step for generating radial range images each having different resolutions based upon the input radial range image by said inputting step;

a making step for making edge-maps each based upon at least neighboring points' locations around a notice point on each of said generated radial range images;

a synthesizing step for synthesizing the edge-maps made by said making step into a synthesized edge-map; and a polygon data generating step for generating polygon data representing an object's shape depending upon an input radial range image input by said inputting step, based upon a synthesized edge-map synthesized by said synthesizing step.

\* \* \* \* \*

UNITED STATES PATENT AND TRADEMARK OFFICE
CERTIFICATE OF CORRECTION

PATENT NO. : 5,621,827

DATED : April 15, 1997

INVENTOR(S) : Shinji Uchiyama, et al.

It is certified that error appears in the above-identified patent and that said Letters Patent is hereby corrected as shown below:

COLUMN 9

Line 36, "prier" should read --prior--.

COLUMN 10

Line 13, "edges-map" should read --edge-map--.

COLUMN 11

Line 38, "said" should read --said making means--.
Line 39, "means" should read --means which--.

COLUMN 14

Line 5, "exist" should read --exists--.

UNITED STATES PATENT AND TRADEMARK OFFICE
CERTIFICATE OF CORRECTION

PATENT NO. : 5,621,827

DATED : April 15, 1997

INVENTOR(S) : Shinji Uchiyama, et al.

It is certified that error appears in the above-identified patent and that said Letters Patent is hereby corrected as shown below:

<u>COLUMN 15</u>

Line 25, "in to" should read --into--.

Signed and Sealed this

Ninth Day of December, 1997

*Attest:*

BRUCE LEHMAN

*Attesting Officer*      *Commissioner of Patents and Trademarks*